(No Model.) 2 Sheets—Sheet 1.

H. LEMP.
ELECTRICAL APPARATUS FOR WELDING RINGS.

No. 428,617. Patented May 27, 1890.

WITNESSES:

INVENTOR
Hermann Lemp
BY
H. C. Townsend
ATTORNEY.

UNITED STATES PATENT OFFICE.

HERMANN LEMP, OF LYNN, MASSACHUSETTS, ASSIGNOR TO THE THOMSON ELECTRIC WELDING COMPANY, OF MAINE.

ELECTRICAL APPARATUS FOR WELDING RINGS.

SPECIFICATION forming part of Letters Patent No. 428,617, dated May 27, 1890.

Application filed October 17, 1889. Serial No. 327,256. (No model.)

*To all whom it may concern:*

Be it known that I, HERMANN LEMP, a citizen of the United States, and a resident of Lynn, in the county of Essex and State of Massachusetts, have invented certain new and useful Apparatus for Welding Rings, of which the following is a specification.

My invention relates to that class of metal-working apparatus in which heavy currents of electricity are employed for the purpose of heating a piece or pieces of metal to be worked while the same are held in proper clamps or jaws adapted to convey the electric current to the metal.

My invention is designed more particularly for use in that class of apparatus which is employed especially for forming a welded joint by the passage of an electric current across the joint from one side to the other and the application of pressure in a direction transverse to the joint.

The special object of my invention is to facilitate the operation of forming welded joints in rings or other curved pieces of metal. In apparatus of this character heretofore employed the curved piece or pieces of metal at opposite sides of the joint have been held or grasped by two sets of jaws or clamps fixed upon the metal and adapted to move one toward the other on a curved line corresponding to the curve of the object or piece of metal under manipulation. In this apparatus the metal requires to be clamped at both the inner and outer sides of the curved portion thereof.

My invention consists of clamping conducting-jaws suitably mounted, so as to be moved in a line which will intersect the curve of the piece or pieces of metal to be welded together at a point near the weld or part to be worked and bearing against the curved piece of metal at the outside of the same, as will be more particularly hereinafter described.

My invention consists also in curved clamping-jaws pivoted eccentrically to the curve on which their clamping-surfaces are formed, so that when they are moved toward one another they will move on a line intersecting the curve of the curved pieces of metal between them.

My invention consists also in certain details or features of construction hereinafter described and claimed.

Figure 4:
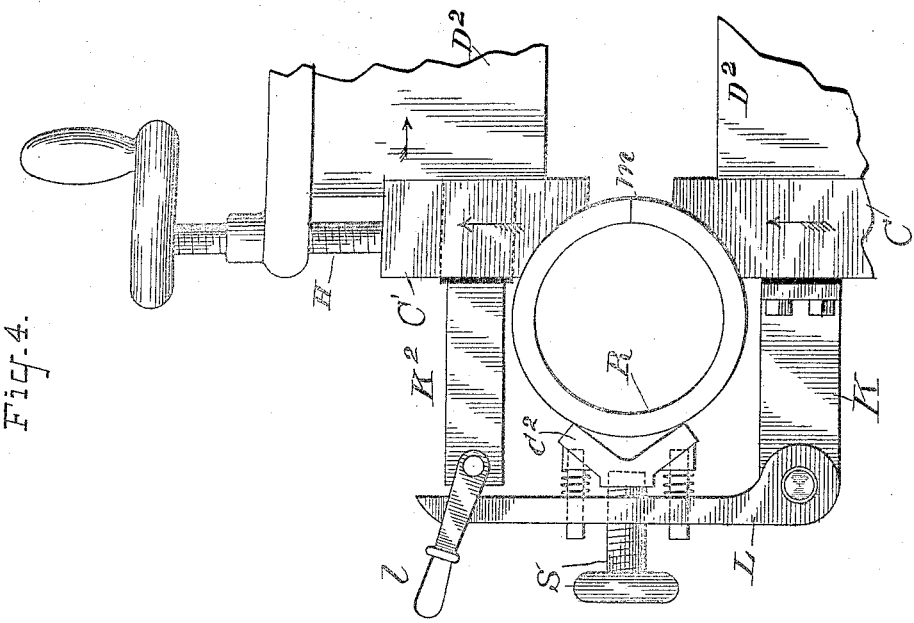
Figure 1:
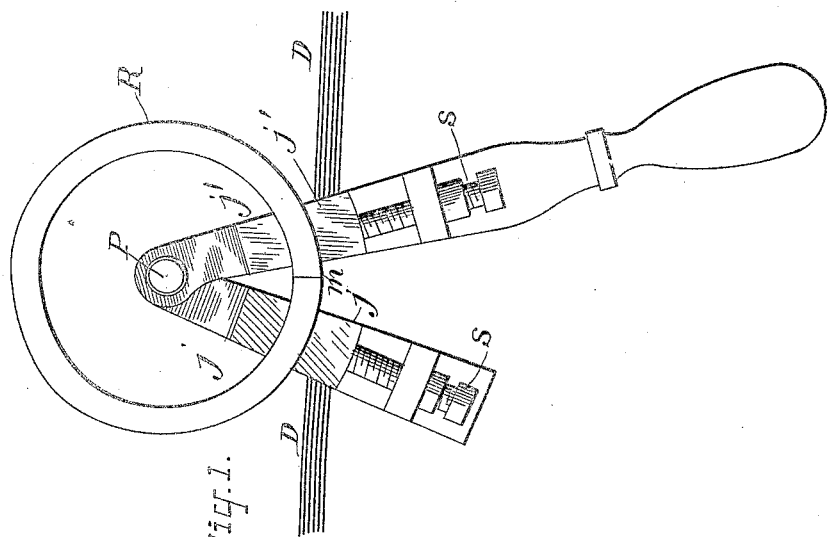

In the accompanying drawings, Figure 1 is a plan of a form of apparatus heretofore employed for welding metal rings. Fig. 2 is a plan of a form of apparatus embodying my invention. Fig. 3 shows the same apparatus as opened after the formation of the weld. Fig. 4 illustrates a modification of my invention in which the clamps or clamping-jaws instead of being pivoted are made to slide in a straight line.

Referring to Fig. 1, which shows a form of apparatus such as is shown in Patent No. 375,784, issued to Elihu Thomson, January 3, 1888, two pairs of clamping-jaws are indicated pivoted at a point P, approximately the center of the ring R, which is to have a weld formed at the point $m$. The clamping-jaws themselves consist of blocks of copper or other good conductor, (indicated at $j\,j'$,) which are carried upon the arms pivoted at P, and are provided with clamping-screws $s$, by which the blocks of copper may be made to grasp the ring by bearing upon the same on the inside and the outside thereof. The current is conveyed to the blocks of copper by means of flexible conductors D, as well understood in the art.

In my improved form of apparatus (shown in Fig. 2) two clamping-jaws C C' are indicated, each of which is of a general semicircular shape. One or both of such jaws may be pivoted. I prefer, however, to make one of them, as jaw C, fixed, and to pivot the jaw C' at a point P, which is, as indicated, eccentric to the curve or circle formed by such jaws when closed to their fullest extent. A stop $p$ determines the extent of movement of the movable jaw in a direction to close them. When the arm carrying the movable jaw engages with such stop, the curve or line formed by the inner or clamping faces of the jaws conforms to the curve of the object when the weld or other operation is finished.

The pivoted jaw C' is pivoted on jaw C, or and abutting them against one another, and then heating them by the passage of a current and forcing them together, is not herein claimed, as it forms the subject of claims in another application for patent filed by me January 10, 1890, Serial No. 336,500.

What I claim as my invention is—

1. In an electric metal-working apparatus, the combination of two clamps or clamping-jaws having a conducting-bearing on the outside of the curve of the ring or other curved object, and adapted to be moved toward one another on a line intersecting such curve, as and for the purpose described.

2. In an electric metal-working apparatus, the combination, substantially as described, of two curved clamping-jaws pivoted eccentrically to the curve on which their clamping-faces are formed.

3. In an electric welding apparatus for welding rings and other curved pieces, the combination of two semicircular jaws, one or both pivoted to move on a line intersecting the circumference of their circle of which their curved clamping-faces form a part.

4. In an electric welding apparatus, the combination, substantially as described, of two semicircular jaws pivoted to one side of the circumference of a circle formed by the ring or other curved object which is to be welded or worked electrically between them.

5. In an electric welding apparatus, the combination of two semicircular clamping-jaws, each provided with a block of some good conducting material, like copper, and adapted to bear against the outside of the ring or other object to be welded when the jaws are forced toward one another.

Signed at Lynn, in the county of Essex and State of Massachusetts, this 12th day of October, A. D. 1889.

HERMANN LEMP.

Witnesses:
J. WESLEY GIBBONEY,
A. L. ROHRER.

(No Model.) 2 Sheets—Sheet 1.
H. LEMP.
TRANSFORMER FOR HEAVY CURRENTS.
No. 428,618. Patented May 27, 1890.
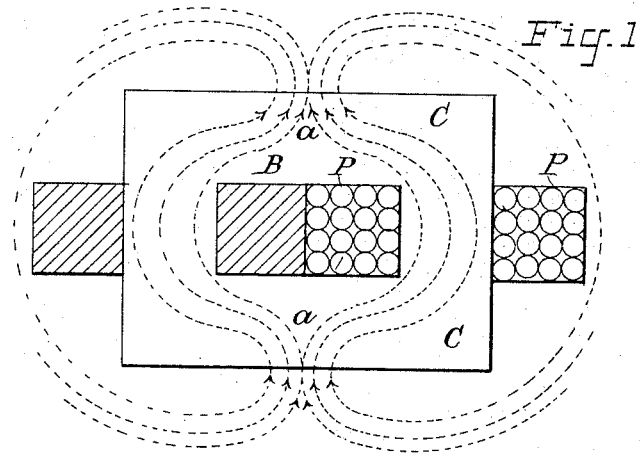
Fig. 1.
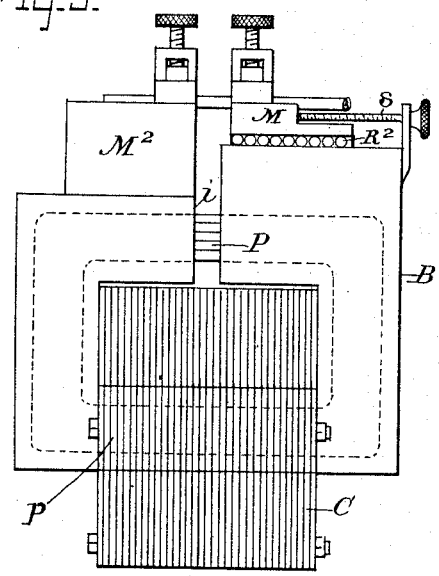
Fig. 3.
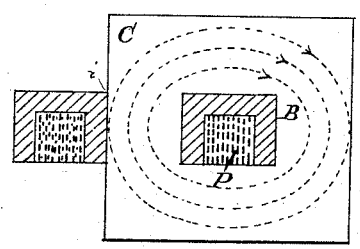
Fig. 2.
Fig. 4.
ATTEST:
J. A. Hurdle
Wm. H. Capel
INVENTOR:
Hermann Lemp
By H. L. Townsend
Attorney